US006213690B1

United States Patent
Gregor et al.

(10) Patent No.: US 6,213,690 B1
(45) Date of Patent: Apr. 10, 2001

(54) DISTRIBUTION MANIFOLD FOR AIR SEEDER

(75) Inventors: David Walter Gregor, Davenport, IA (US); Terry Lee Snipes, East Moline; Donald Raymond Wisor, Moline, both of IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/281,556

(22) Filed: Mar. 30, 1999

(51) Int. Cl.⁷ .................................................. B65G 53/40
(52) U.S. Cl. ..................... 406/123; 137/595; 406/127; 406/182; 406/118; 406/120
(58) Field of Search .................................. 111/178, 177, 111/181, 182, 179, 80; 406/123, 127, 128, 182, 183, 118, 119, 120; 137/595

(56) References Cited

U.S. PATENT DOCUMENTS

| | | |
|---|---|---|
| 2,097,397 | * 10/1937 | Heinrich . |
| 2,214,736 | * 9/1940 | Carmichael et al. . |
| 3,302,904 | * 2/1967 | Buchwald . |
| 3,621,877 | * 11/1971 | Hickmann ............................ 137/595 |
| 4,717,289 | * 1/1988 | Popowich et al. ................... 406/122 |
| 4,779,765 | 10/1988 | Neumeyer ............................ 222/142 |
| 4,817,374 | * 4/1989 | Kitta ...................................... 60/313 |
| 4,834,004 | * 5/1989 | Butuk et al. ......................... 111/200 |
| 5,147,152 | * 9/1992 | Link ......................................... 406/1 |
| 5,601,209 | * 2/1997 | Barsi et al. .......................... 221/266 |
| 5,855,303 | 1/1999 | Gregor ................................. 222/368 |
| 5,947,040 | * 9/1999 | Gregor ................................. 111/174 |
| 5,979,343 | * 11/1999 | Gregor et al. ....................... 111/175 |
| 5,980,163 | * 11/1999 | Gregor et al. ....................... 406/144 |

OTHER PUBLICATIONS

Deere & Company Marketing Information Bulletin, No. 97–7–10, titled "1900 Commodity Cart", pp. 1 and 3, published in the U.S.A.
Advertisement titled "Flexi–Coil Air Cart Advantages", p. 10.

* cited by examiner

*Primary Examiner*—Christopher P. Ellis
*Assistant Examiner*—Richard Ridley

(57) ABSTRACT

A primary air distribution manifold for an air seeder's pneumatic distribution system, wherein the primary air distribution manifold is provided with a top rank of venturis and a bottom rank of venturis for receiving an air stream from a blower which is divided into a top rank air stream and a bottom rank air stream. A selector valve is located above the top rank of venturis immediately below a product meter. The selector valve selectively directs metered product to either the top rank of venturis or the bottom rank of venturis. In a first position the selector valve directs metered product to the top rank of venturis in its second position the selector valve directs metered product to the bottom rank of venturis. Each selector valve is also provided with first and second air valves. In the selector valve's first position, the first air valve is open and directs air tapped from the top rank air stream to the product tank feeding product to the top rank of venturis. The second air valve is closed as it taps air from the bottom rank air stream. Similarly if the selector valve is in its second position, the first air valve is closed and the second air valve opened so that bottom rank air is directed to the product tank feeding product to the bottom rank of venturis.

13 Claims, 9 Drawing Sheets

DISTRIBUTION MANIFOLD FOR AIR SEEDER

BACKGROUND OF THE INVENTION

1. Field of the Invention

The present invention is directed to an improved primary air distribution manifold for use on air seeder, wherein the manifold is provided with a selector valve for directing product to different ranks of venturis.

2. Description of the Prior Art

Air seeders and other seeding devices are commonly towed by tractors to apply seed or fertilizer, or both simultaneously, to a field. As an example, an air seeder may be towed in combination with a tilling implement, one behind the other, to place seed and fertilizer under the surface of the soil. An air seeder has as its central component a wheeled seed cart which comprises one or more frame-mounted product tanks for holding product, generally seed or fertilizer or both. Air seeders also generally comprise a metering system for dispensing product from the tanks and a pneumatic distribution system for delivering the product from tank to soil.

It is known to provide an air seeder with volumetric meters which measure a fixed volume of seed per unit of linear distance. These volumetric meters typically comprise either augers or fluted cylinders (meter rollers) which rotate through a product reservoir to measure granular product. The meters rotate to feed product into a pneumatic distribution system. The pneumatic distribution system of an air seeder generally utilizes a blower to provide at least one airstream which flows through the pneumatic distribution system to seed boots where product is deposited in the soil. Metered product is introduced into the air stream at a primary air distribution manifold located below the product meter. Product is carried by the air stream through distribution lines to a series of secondary distribution manifolds ("headers"), which in turn distribute product through individual lines to seed boots mounted behind ground openers on the tilling implement.

Operators of conventional seeding equipment have problems configuring distribution manifolds for accepting metered product from multiple tanks entering into the pneumatic distribution systems. When an operator wants to switch tank applications or the setup of the tilling implement, the operator must reconfigure downstream distribution lines to ensure that product is applied in the proper location on the tilling implement. One possible solution is disclosed in U.S. Pat. No. 5,855,303.

SUMMARY

It is an object of the present invention to provide a primary air distribution manifold having a selector valve to easily direct metered product from the product meter to a selected rank of venturis.

It is another object of the present invention to provide a primary air distribution manifold wherein the selector valve automatically directs a clean air stream to the product tanks for tank pressurization.

It is a feature of the present invention that the position of the selector valve is readily apparent to an operator.

A primary air distribution manifold for an air seeder's pneumatic distribution system, wherein the primary air distribution manifold is provided with a top rank of venturis and a bottom rank of venturis for receiving an air stream from a blower. A selector valve is located above the top rank of venturis immediately below a product meter. The selector valve selectively directs metered product to either the top rank of venturis or the bottom rank of venturis. The selector valve comprises two transversely extending rods with valve members extending longitudinally between the rods. In a first position the selector valve directs metered product to the top rank of venturis, in its second position the selector valve directs metered product to the bottom rank of venturis. Both ends of the selector valve are provided with handles for positioning the selector valve.

Each selector valve is also provided with first and second air valves. The air valves are positioned at the ends of the selector valve between the handle and the valve members. In the selector valve's first position, the first air valve is open and directs air tapped from the top rank air stream to the product tank immediately above the primary air distribution manifold. The second air valve is closed as it taps air from the bottom rank air stream. Similarly if the selector valve is in its second position the first air valve is closed and the second air valve opened so that bottom rank air is directed to the product tank. In this way the same air stream rank is tapped for pressurizing the tank from which the metered product is received.

DETAILED DESCRIPTION

Figure 1:
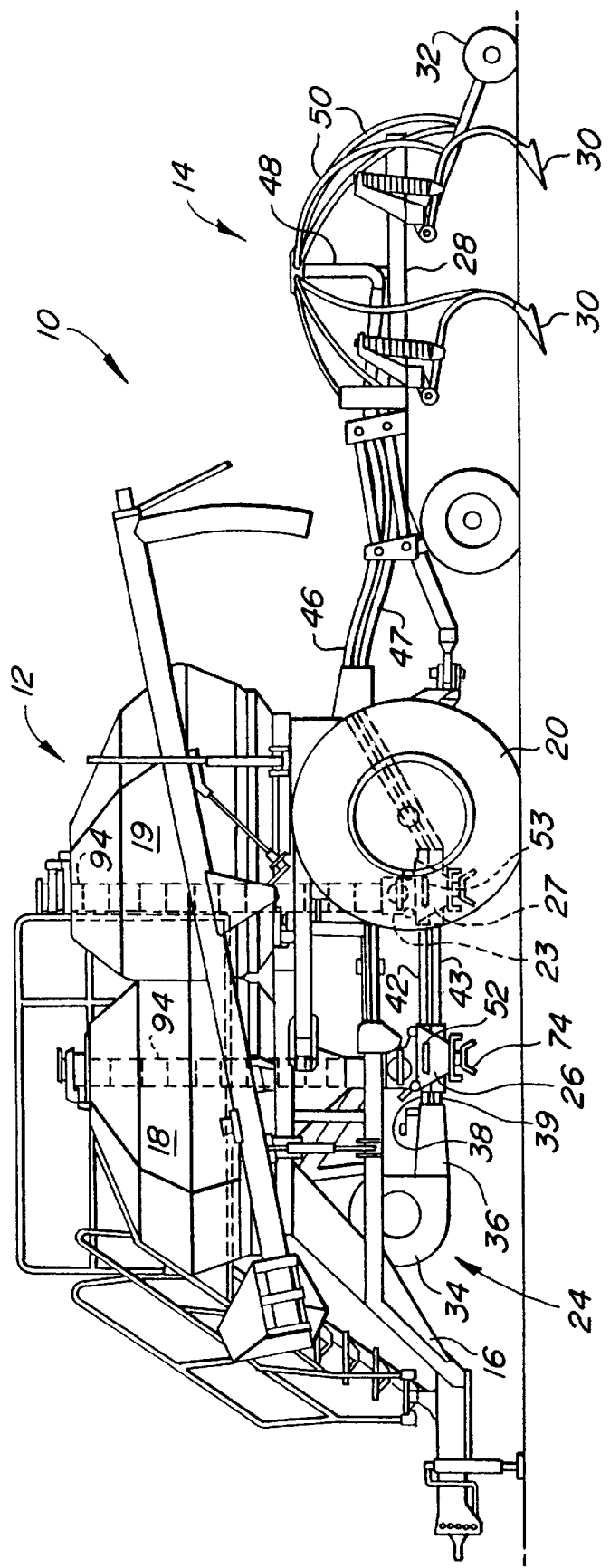
FIG. 1 is a side view of an air seeder.

As shown in FIG. 1, air seeder 10 comprises a seed cart 12 and a tilling implement 14. The seed cart is typically towed by a tractor through a field to be seeded. The seed cart 12 has a frame 16 supporting a first product tank 18 and a second product tank 19. Wheels 20 are rotatably mounted to the frame. The first product tank 18 is provided with a first product meter 22, and the second product tank 19 is provided with a second product meter 23. The product meters 22 and 23 are located below the product tanks 18 and 19 and receive product therefrom for controlled feeding of product into a pneumatic distribution system 24. Located below the first product meter 22 is a first primary air distribution manifold 26 and a second primary air distribution manifold is located below the second product meter 23. Both manifolds being part of the pneumatic distribution system 24. The tilling implement 14, towed behind the seed cart 12, comprises a frame 28 to which ground openers 30 are mounted. The tilling implement maybe provided with seed row finishing equipment such as packers 32. FIG. 1 illustrates a double shot air seeder wherein a first product contained in product tank 18 is directed to the top rank portion of the air stream and the second product contained in product tank 19 is directed to the bottom rank portion of the air stream. The present invention can also be used in triple shot applications where the three products are added to three different rank portions of the air stream.

The pneumatic distribution system 24 distributes metered product from the product tanks 18 and 19 to the ground openers 30. The product contained in the product tanks 18 and 19 may include seed, fertilizer or other granular products. The pneumatic distribution system 24 comprises a blower 34 driven by a hydraulic motor which directs a stream of pressurized air through an adjustable damper 36 which directs the air stream into a top rank portion directed into an upper rank of first tubes 38 and a bottom rank portion directed into a bottom rank of first tubes 39. The top rank of first tubes 38 directs the top rank portion of the air stream into the top rank of venturis 40 in the first primary air distribution manifold 26. The bottom rank of first tubes 39 directs the bottom rank portion of the air stream into a bottom rank of venturis 41 in the first primary distribution manifold 26.

From the top rank of venturis 40 extending rearwardly are a second top rank of tubes 42 which extend to the top rank of venturis 44 on the second primary air distribution manifold 27. A second bottom rank of tubes 43 extend between the bottom rank of venturis 41 on the first primary air distribution manifold 26 and the lower rank of venturis 45 on the second primary distribution manifold 27.

A third top rank of tubes 46 is pneumatically coupled to the top rank of venturis 44 in the second primary air distribution manifold and extend to individual secondary air distribution manifolds 48 having individual tubes 50 which extend to the ground openers 30. Similarly the bottom rank of venturis 45 of the second primary air distribution manifold is provided with a third bottom rank of tubes 47 that extend to secondary air distribution manifolds 48. The secondary air distribution manifolds 48 are identical and comprise a upwardly extending tube having a header which distributes the product contained in the air stream to the individual ground openers through individual tubes 50.

Product from tanks 18 and 19 is metered by the respective product meter 22 or 23. The product enters the air stream through the venturis 40, 41, 44 or 45. The first primary air distribution manifold 26 is provided with a first selector valve 52 positioned between the first product meter 22 and the venturis 40 and 41. The second primary air distribution manifold 27 is provided with a second selector valve 53 which is similarly positioned between the second product meter 23 and the venturis 44 and 45.

Figure 5:
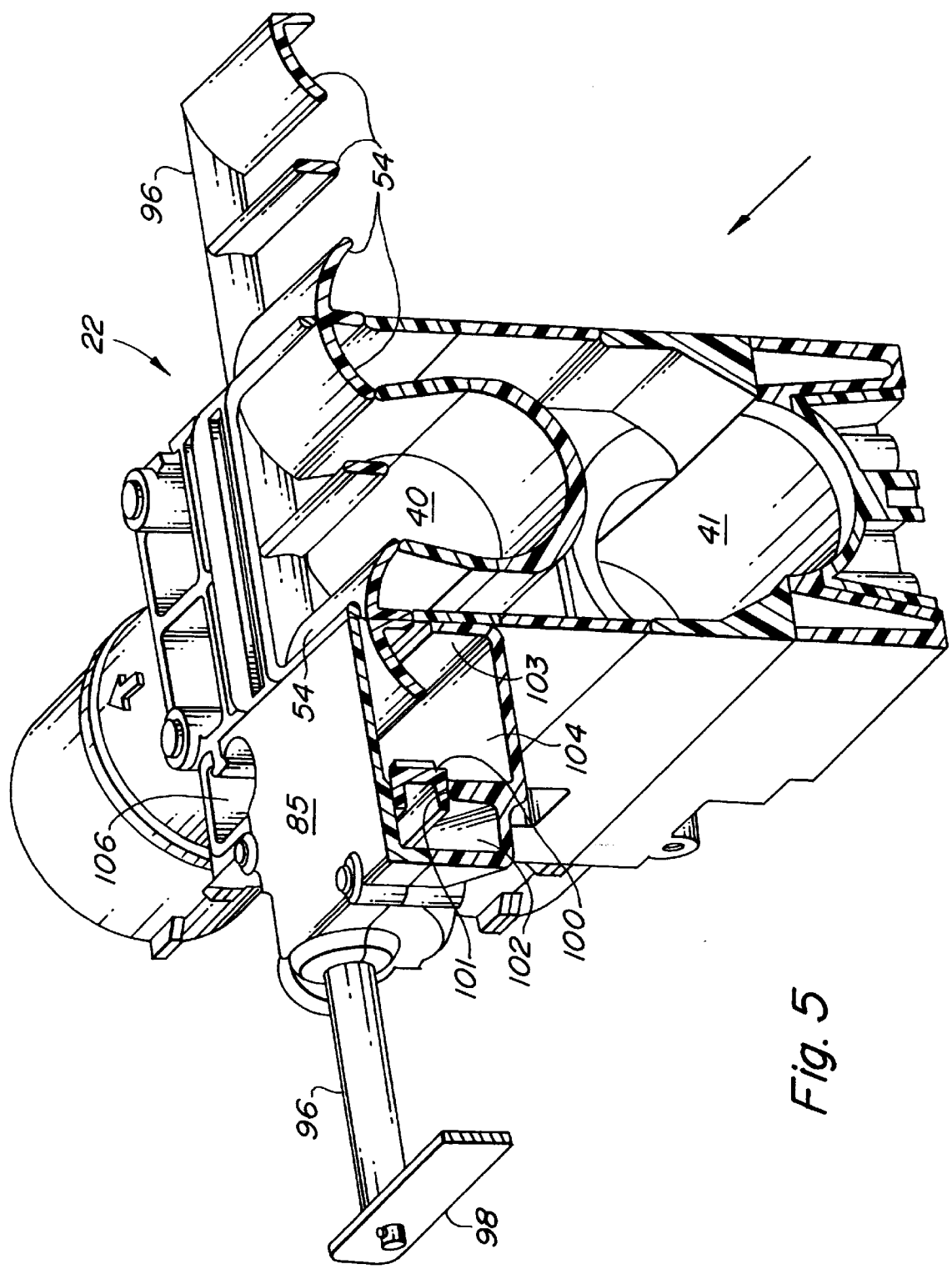
FIG. 5 is a perspective partial cross sectional view of the primary distribution manifold with the slide valve in the first position.
Figure 6:
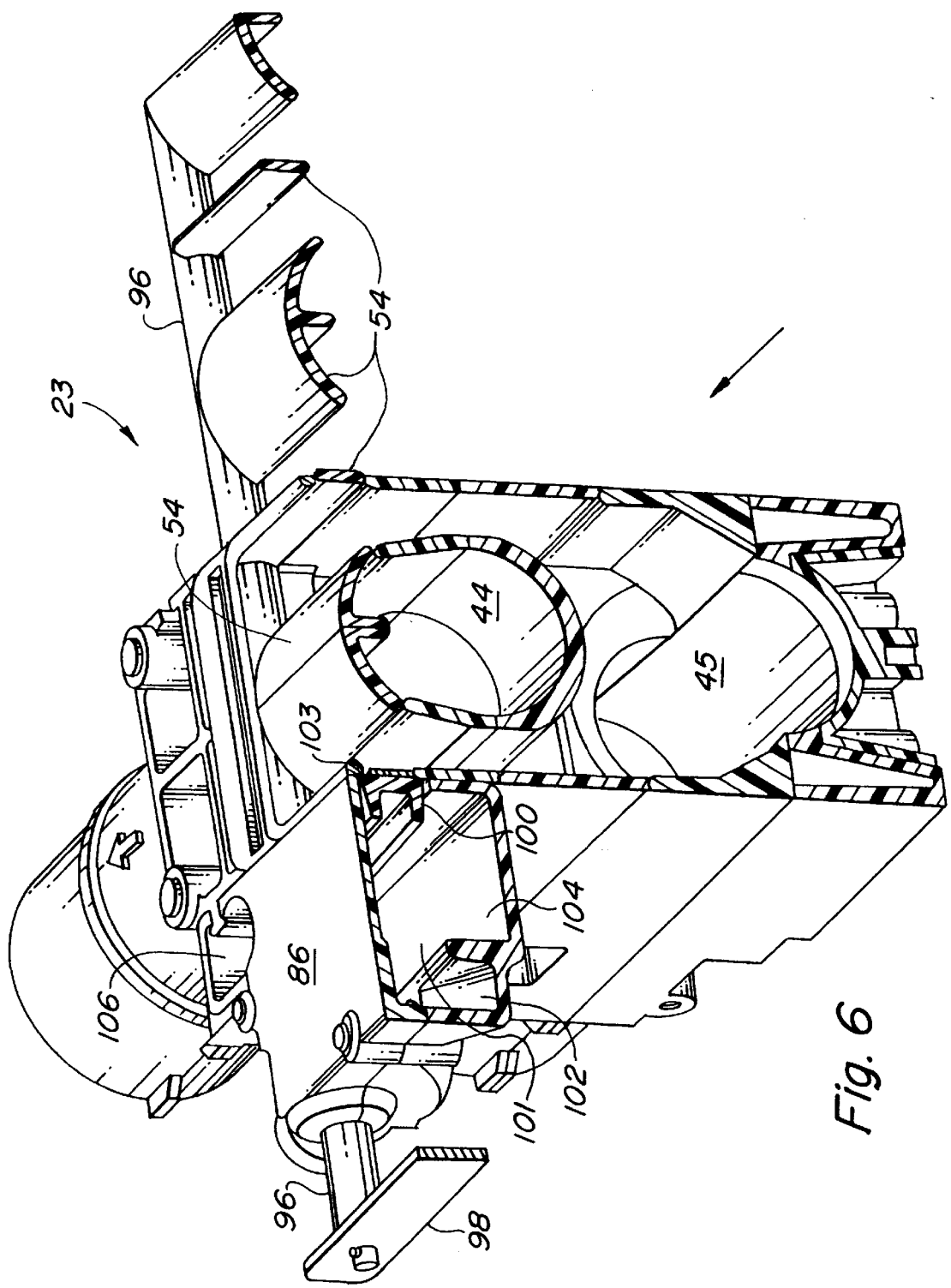
FIG. 6 is a perspective partial cross sectional view of the primary distribution manifold with the slide valve in the second position.

When the selector valve 52 is in its first position as illustrated in FIG. 5, product from the product meter 22 is directed to the top rank of venturis 40 and blocked from the bottom rank of venturis 41 by convex valve members 54. The top rank portion of the air stream passing through the top rank of venturis 40 picks up the metered product from first product tank 18 deposited therein by product meter 22 and proceeds through top rank tubes 42 to the top rank of venturis 44 located in the second primary air distribution manifold 27. Second selector valve 53, illustrated in FIG. 6, is in its second position wherein metered product from second product tank 19 is metered by product meter 23 and directed to the bottom rank of venturis 45 and blocked from the top rank of venturis 44 by convex valve members 54. In this illustrated embodiment product from the first product tank 18 is carried by the top rank of tubes and venturis 40, 42, 44 and 46 and product from the second tank 19 is carried by the bottom rank of tubes and venturis 45 and 47. The first and second primary air distribution manifolds 26 and 27 are identical and the valve positions could be reversed if the operator desired to feed the bottom rank of tubes and venturis with product from tank 18 and the top rank of tubes and venturis with product from tank 19.

Both primary air distribution manifolds 26 and 27 are provided with an inverted U-shaped sheet metal support 60 which is bolted to the seed meter 22 by mounting bolts 62. The seed meter 22 in turn is secured to the frame 16. Extending downwardly from the base plate 64 of the support 60 are both the top and bottom ranks of venturis 40 and 41. The venturis are formed from plastic and secured to the support 60 by bolts. The bottom rank venturis 41 are open at their bottoms. Plastic plugs 66 for closing the bottoms of venturis 41 are secured to a plate 68 by bolts 70. The plate 68 is held in place by bolts 72 extending downwardly from the legs 73 of support 60 and are secured to these bolts and held in place by large wing nuts 74.

The present invention is disclosed in a double shot application, that is two separate products are applied at the same time. This invention could also be used in triple shot application where three separate products are applied. In a triple shot application a third primary air distribution manifold is added and an additional rank of venturis is added to each manifold. This new rank is a middle rank being located between the top rank and the bottom rank. Each primary air distribution manifold would be provided with two valves a first valve for determining if product flows to the top rank of venturis and a second valve which determines if product flowing past the first rank of venturis is directed to the middle or bottommost rank or venturis.

Figure 8:
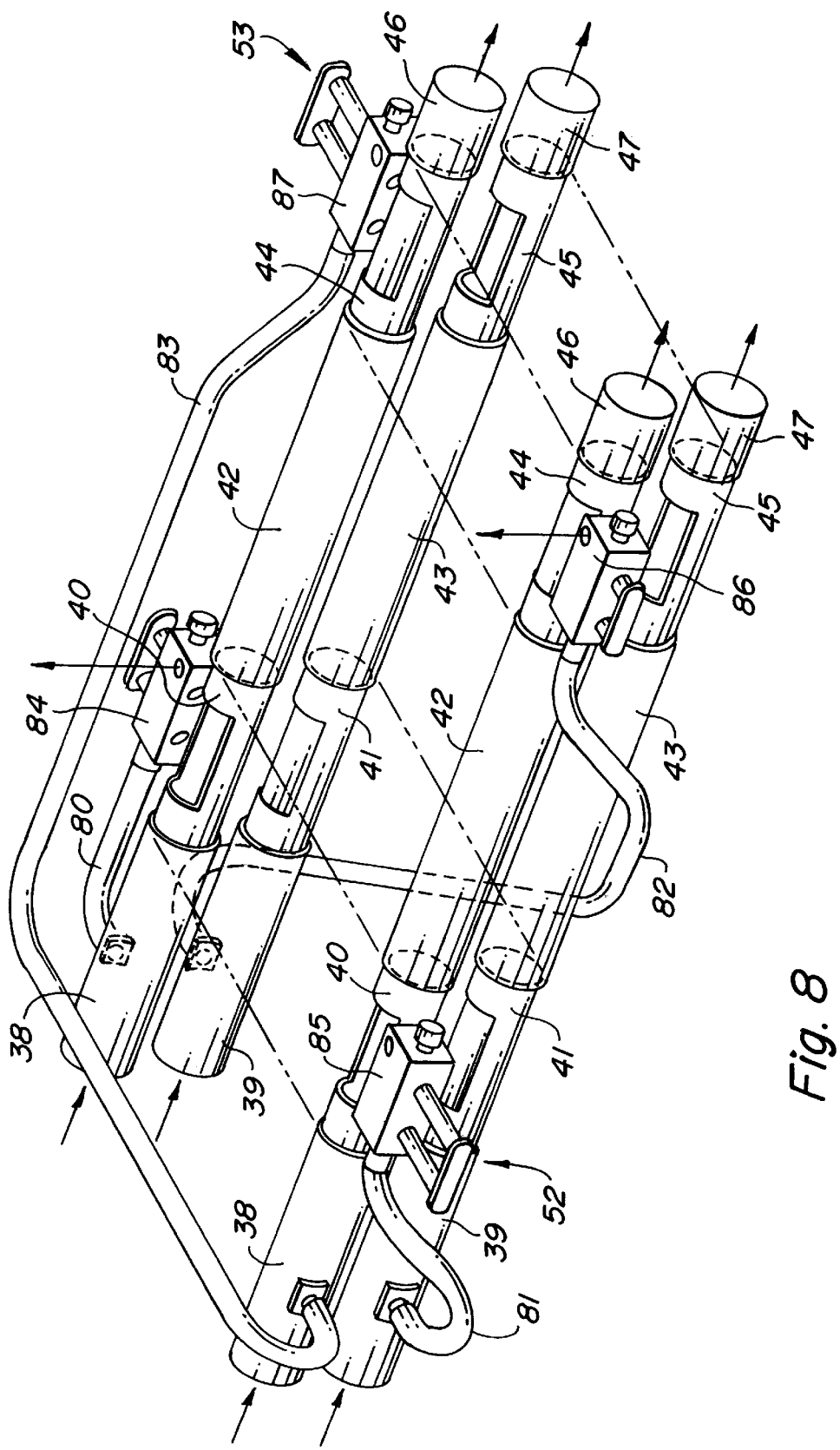
FIG. 8 is a perspective schematic of the air distribution system.
Figure 9:
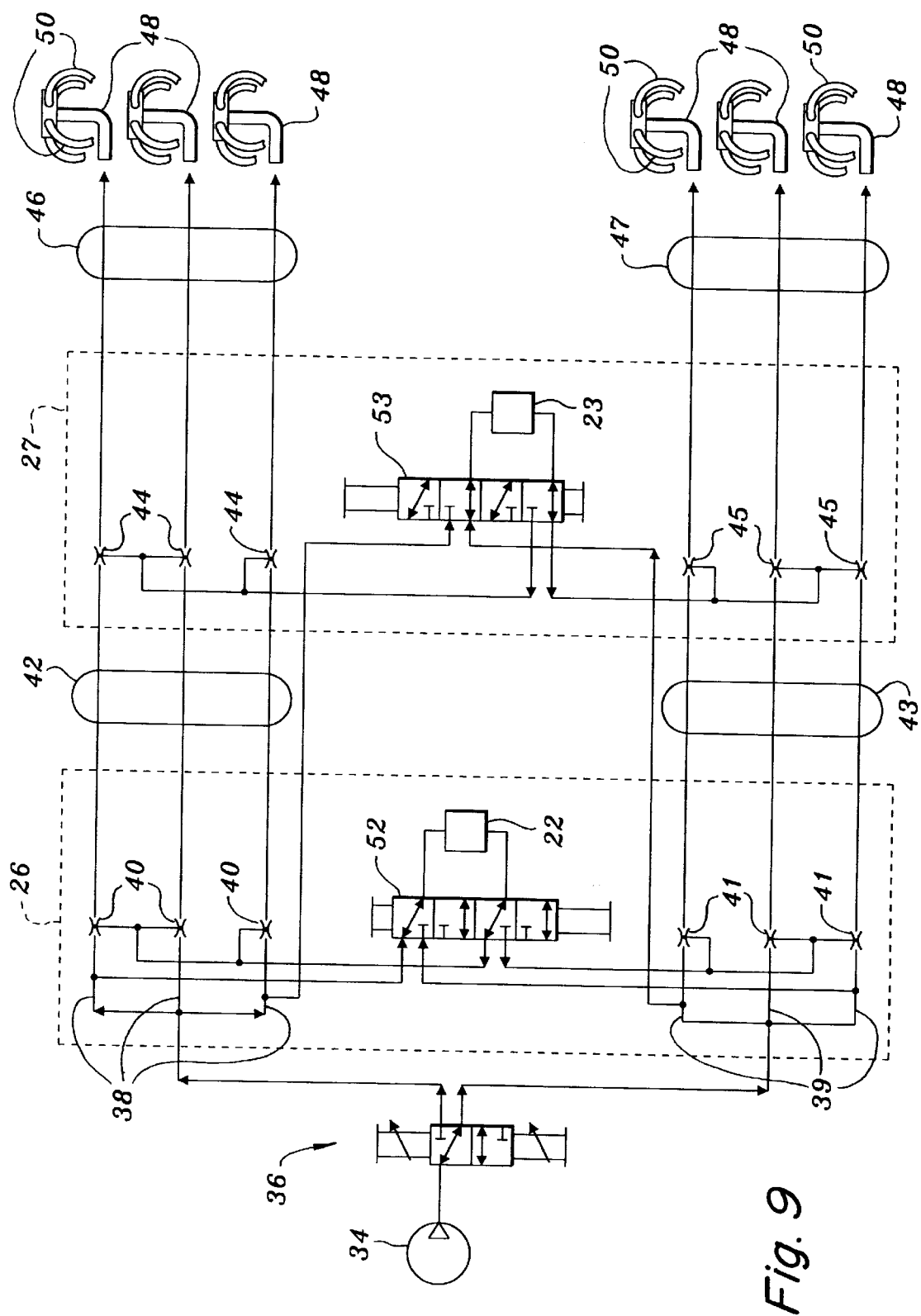
FIG. 9 is an air flow schematic.

Air from the pneumatic distribution system 24 is used to pressurize the product tanks 18 and 19. That is air is tapped from the outermost first tubes 38 and 39 of both top and bottom ranks. This air stream is directed by air hoses 80, 81, 82 and 83 to air valves 84, 85, 86 and 87, respectively. As shown in FIG. 8, the selector valves 52 and 53 control the flow of metered product to the top and bottom ranks of venturis. These valves also control the flow of air to pressurize the product tanks 18 and 19. When the selector valve 52 is in its first position, air is tapped from top rank tube 38 by air hose 80 and is directed to air valve 84 which is open and directs air through seed meter passage 90 to upwardly extending conduit 92 which forms part of the ladder 94 located in the product tank 18. This air is directed to the top of the product tank 18 and is used to slightly pressurize the product tank 18. As selector valve 52 is in its first position, air valve 85 receiving air from air hose 81 is closed. Moving onto selector valve 53, selector valve 53 is in its second position thereby opening air valve 86 to allow air in air hose 82 to move into seed meter passage 90 of seed meter 23 and pressurize product tank 19. Similarly air valve 87 is closed to air received through air hose 83.

Selector valves 52 and 53 are ladder shaped with longitudinally extending convex valve members 54 extending between two transversely extending rods 96. The ends of the valves are provided with handholds 98 for facilitating the sliding movement of the valve. The handholds maybe locked in their selected position by lockout 99 which traps the handhold 98 selector valves in either their first or second position. Between handholds 98 and valve members 54 are air valves 100 which either seal opening 101 in air plenum 102 or opening 103 in air plenum 104. As shown in FIG. 5, selector valve 52 is in its first position so that air valve 85 is closed. Air valve 85 is closed by air valve 100 closing opening 101 and thereby closing plenum 102 off from air plenum 104. In FIG. 6 valve 53 is in its second position so that air valve 86 is open. As shown in FIG. 6, air valve 100 seals opening 103 in the side wall of air plenum 104 and opening 101 between air plenum 102 and 104. Air from air hose 83 passes into plenum 102 and then into 104 where it is directed through opening 106 into seed meter passage 90.

Figure 7:
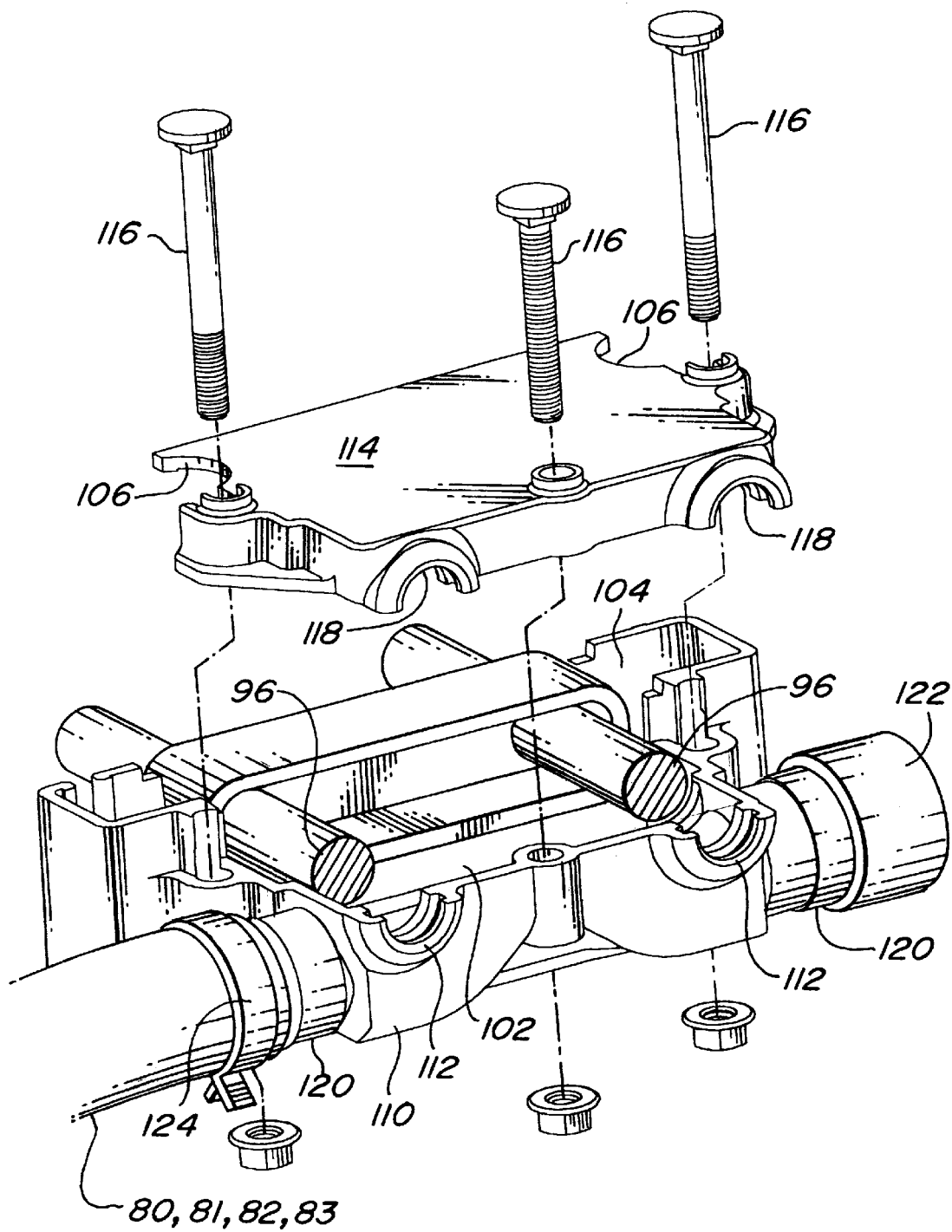
FIG. 7 is an explode perspective view of the air valve

The structure of the air valves is best illustrated in FIG. 7. The air valve comprises a base housing 110 having two semicircular transverse openings 112. A cover 114 is bolted to the base housing 110 by mounting bolts 116. The top housing is also provided with two transverse semi-circular openings 118 which correspond to openings 112 and provide a passage for rods 96 of the selector valve. The base housing 110 is also provided with two nipples 120 to which an air hose can be coupled. It should be noted that in operation one nipple is always capped off by cap 122 and one nipple is coupled to an air hose by a suitable hose clamp 124. In addition, the cover 114 is provided with two air passages 106 for directing air to the seed meter passage 90. Again only one passage is open with the other being closed by sealing plate 126. Two nipples 120 and two air passages 106 are provided so that the air valve can be mounted to either side of the selector valve and to minimize the required parts. The cover 114 and the base housing 110 define a first air plenum 102 and a second air plenum 104.

Figure 2:
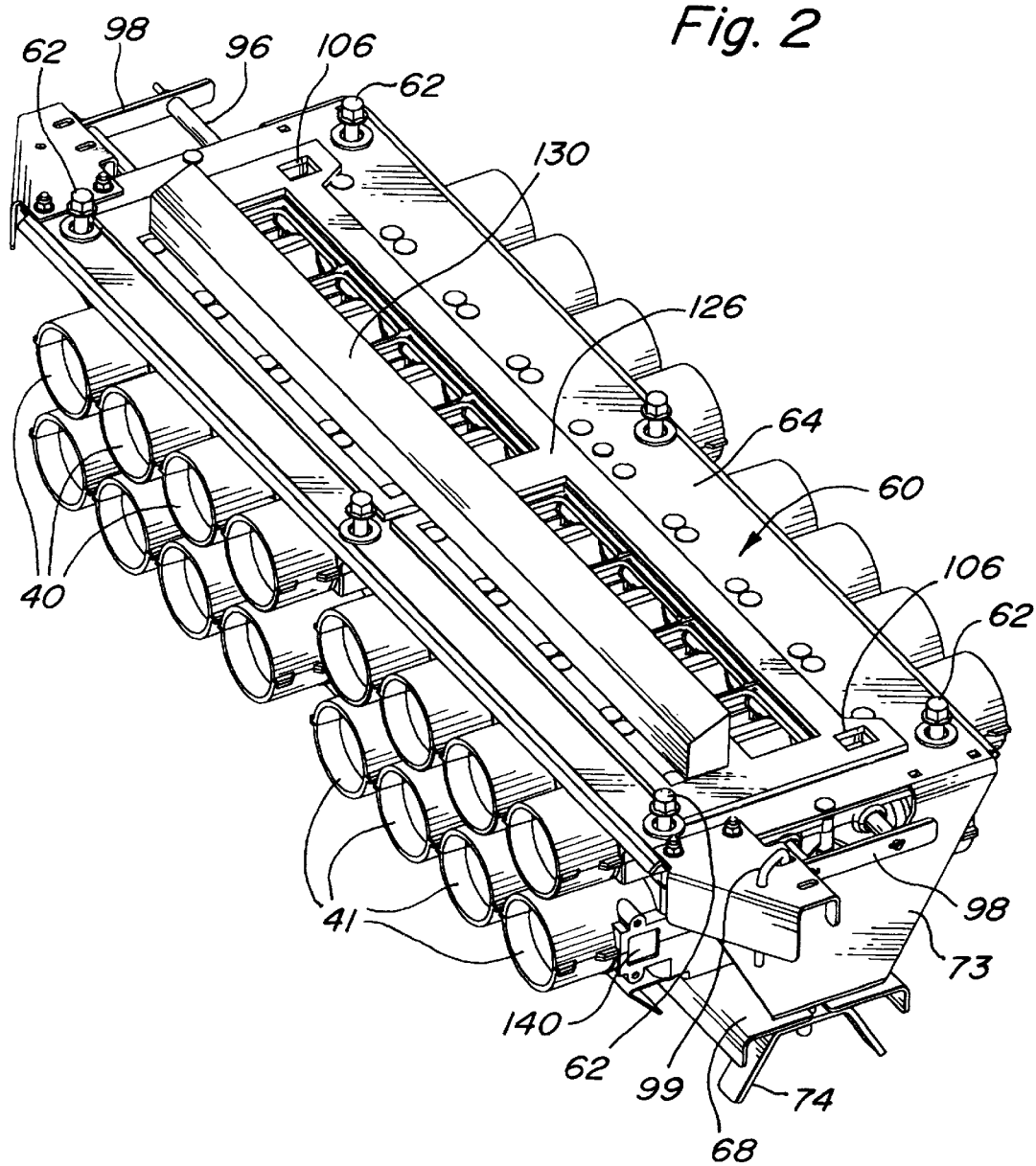
FIG. 2 is a perspective view of the primary distribution manifold.
Figure 3:
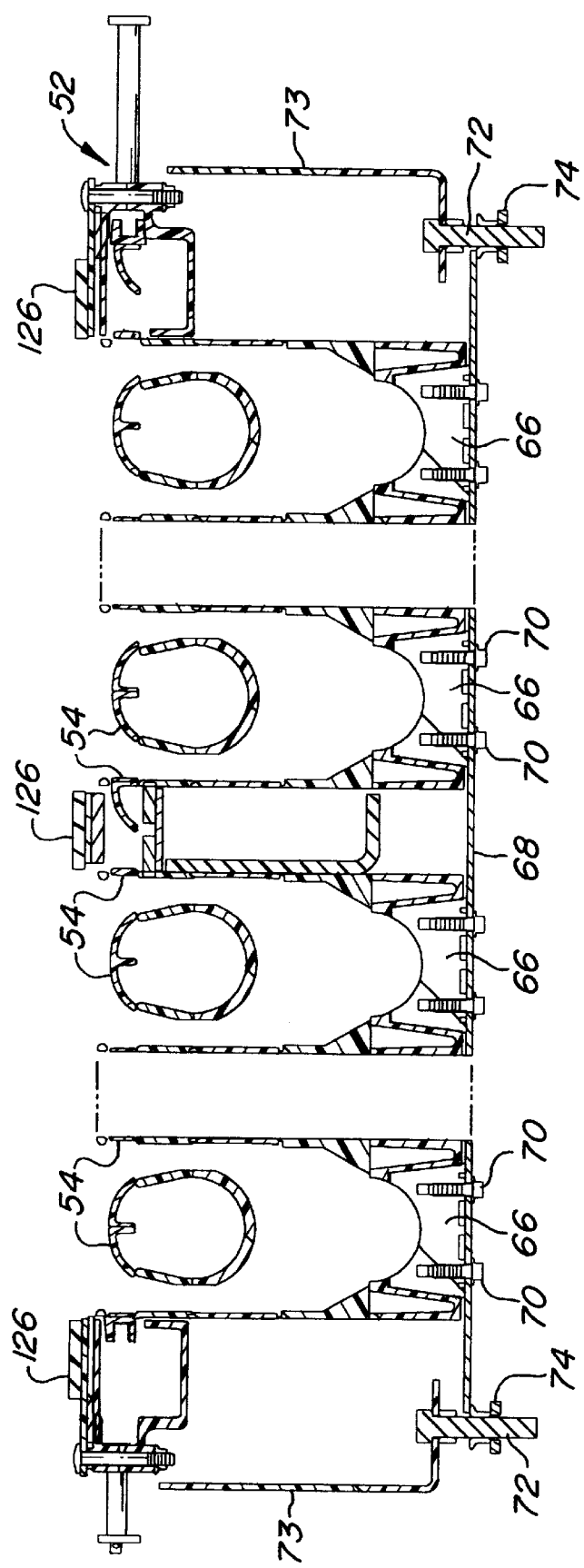
FIG. 3 is a front cross sectional view of the primary distribution manifold.
Figure 4:
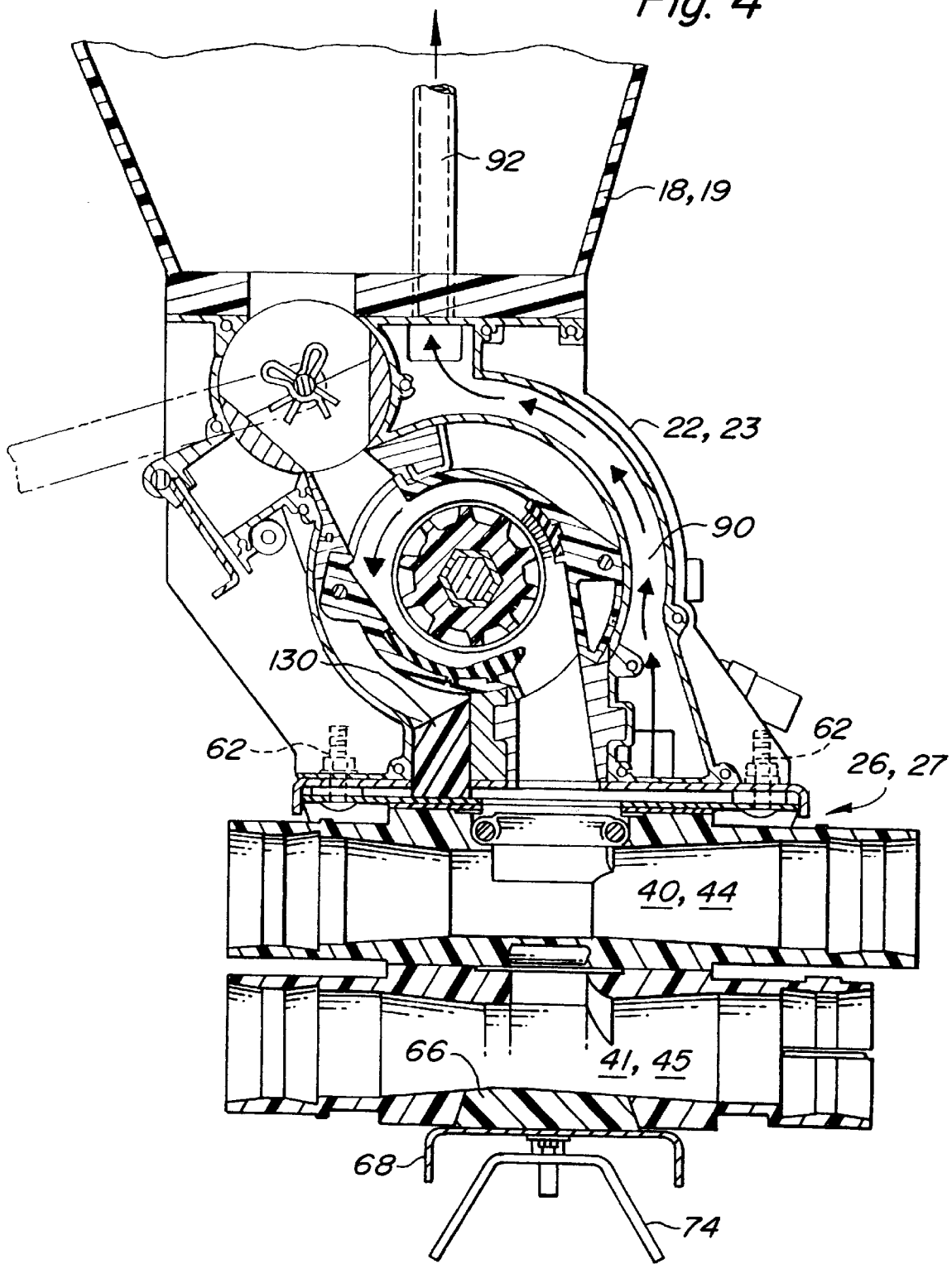
FIG. 4 is a side cross sectional view of the primary distribution manifold and the associated product meter.

As shown in FIGS. 2 and 4 the sealing plate 126 is provided with an upwardly extending sealing plug 130 that extend into the seed meters 22 and 23 for sealing passage 132 located therein.

The bottom rank of venturis is provided with a knock out section 140 which is used if the bottom rank of venturis are configured as a single shot system. In a single shot system the top rank of venturis, the selector valve and the air valves would be eliminated and knock section 140 would be removed so that air is tapped from the single air stream and directed by an associated housing through seed meter passage 90 to the product tank.

The invention should not be limited to the above described embodiment, but should be limited solely to the claims that follow:

1. A primary air distribution manifold for dispensing product into an airstream, said distribution manifold comprising:
   a top rank of venturis through which a top rank air stream passes;
   a bottom rank of venturis through which a bottom rank air stream passes;
   a selector valve is positioned above the top rank of venturis and has a first position for directing product to the top rank venturis for becoming entrained in the top rank air stream, the selector valve has a second position wherein product is directed to the bottom rank of venturis for becoming entrained in the bottom rank air stream.

2. A primary air distribution manifold as defined in claim 1 wherein the selector valve is provided with first and second air valves for pressurizing product tanks the first air valve is open and the second air valve closed when the selector valve is in its first position, the first air valve directing a portion of the top rank air stream to a product tank feeding product to the top rank of venturis, when the selector valve is placed in its second position the second air valve is open and the first air valve is closed, the second air valve directing a portion of the bottom rank air stream to a product tank feeding product to the bottom rank of venturis.

3. A primary air distribution manifold as defined by claim 2 wherein the first and second air valves receive air to pressurize product tanks from upstream of the venturis.

4. A primary air distribution manifold as defined by claim 3 wherein the selector valve has longitudinally extending convex valve members.

5. A primary air distribution manifold as defined by claim 4 wherein the selector valve is provided with two transversely extending rods between which the convex valve members extend.

6. A primary air distribution manifold as defined by claim 5 where the selector valve is provided with two handholds for selectively shifting the selector valve.

7. A primary air distribution manifold as defined by claim 6 wherein a lockout locks the selector valve in either its first position or its second position.

8. A primary air distribution manifold as defined by claim 1 wherein the selector valve has longitudinally extending convex valve members.

9. A primary air distribution manifold as defined by claim 8 wherein the selector valve is provided with two transversely extending rods between which the convex valve members extend.

10. A primary air distribution manifold as defined by claim 9 where the selector valve is provided with two handholds for selectively shifting the selector valve.

11. A primary air distribution manifold as defined by claim 10 wherein a lockout locks the selector valve in either its first position or its second position.

12. A primary air distribution manifold for dispensing product into an airstream, said distribution manifold comprising:
    a top rank of venturis through which a top rank air stream passes;
    a bottom rank of venturis through which a bottom rank air stream passes;
    a selector valve is positioned above the top rank of venturis and is provided with first and second air valves for pressurizing product tanks, the first air valve being open and the second air valve being closed when the selector valve is a first position, the first air valve directing a portion of the top rank air stream to a product tank feeding product to the top rank of venturis, when the selector valve is placed in a second position, the second air valve being open and the first air valve being closed, the second air valve directing a portion of the bottom rank air stream to a product tank feeding product to the bottom rank of venturis.

13. A primary air distribution manifold as defined by claim 12 wherein the first and second air valves receive air to pressurize product tanks from upstream of the venturis.

* * * * *